United States Patent [19]

Kashiwaba

[11] Patent Number: 4,680,083

[45] Date of Patent: Jul. 14, 1987

[54] CUTTER DEVICE FOR A FILM STRIP ON A LAMINATE

[75] Inventor: Tadao Kashiwaba, Iwate, Japan

[73] Assignee: Kabushiki Kaisha Sato, Japan

[21] Appl. No.: 721,856

[22] Filed: Apr. 10, 1985

[30] Foreign Application Priority Data

Apr. 13, 1984 [JP] Japan ................................ 59-74403

[51] Int. Cl.[4] ............................................ B32B 31/18

[52] U.S. Cl. .................................. 156/510; 156/268; 156/353; 156/355; 156/516; 83/510; 83/511; 83/512

[58] Field of Search ............... 156/250, 257, 268, 270, 156/353, 355, 510, 516, 517, 519, 521, 522, 523, 527, 552, 550, 515; 83/510, 511, 512

[56] References Cited

U.S. PATENT DOCUMENTS

| | | | |
|---|---|---|---|
| 3,997,387 | 12/1976 | Yamaguchi et al. | 156/519 |
| 4,048,003 | 9/1977 | Bolli | 156/515 |
| 4,227,960 | 10/1980 | Loeffler et al. | 156/519 |
| 4,494,435 | 1/1985 | Lindsay | 83/511 |
| 4,519,868 | 5/1985 | Hoffman | 156/353 |

*Primary Examiner*—Caleb Weston
*Attorney, Agent, or Firm*—Ostrolenk, Faber, Gerb & Soffen

[57] ABSTRACT

A revolving base roller and a stationary cutter are mounted on opposite sides of the path of a laminated strip, in order to partially cut the strip from one side at desired cut lines along its length. The laminated strip includes a strip of printed labels on the printed side of which is overlaid a transparent film strip which is disposed toward the stationary cutter as the laminated strip passes along its path. A sensor detects an indication that the labels are properly positioned, and a control circuit receives a signal from the sensor and causes a single rotation of the revolving base roller. As the base roller revolves, it pushes against the opposite side of the laminated strip, causing the film strip to be pushed against the stationary cutter, resulting in the cutting of the film strip along the desired cut line. The stationary cutter may be adjusted to provide a cut of the desired depth.

10 Claims, 6 Drawing Figures

CUTTER DEVICE FOR A FILM STRIP ON A LAMINATE

BACKGROUND OF THE INVENTION

1. Field of the Invention

The present invention relates to a cutter device for cutting a film strip such as that used in a laminator or the like, and more particularly to a cutter device for cutting at prescribed positions a film strip overlaid on the surface of labels or the like.

SUMMARY OF THE INVENTION

One object of the present invention is to provide a cutter device for cutting a film strip on a laminate which has an easily adjustable cutting position and can be readily adapted for cutting film strips of various thicknesses.

Another object of the present invention is to provide a cutter device for cutting a film strip on a laminate which, when used in connection with an operation for overlaying films on labels, is capable of cutting a film strip without damaging the printing on the label.

These objects are attained according to the present invention by providing a cutter device for a film strip which comprises a revolving base roller and a stationary cutter opposite each other on opposite sides of the path of the laminated strip. The film strip is cut by rotating the base roller while the film strip is positioned between the revolving base roller and the stationary cutter, so that the base roller pushes the laminated strip against the cutting surface of the cutter.

The invention will be better understood and other objects and advantages thereof will be more apparent from the following detailed description of a preferred embodiment with reference to the accompanying drawings.

DESCRIPTION OF THE PREFERRED EMBODIMENT

Figure 2:
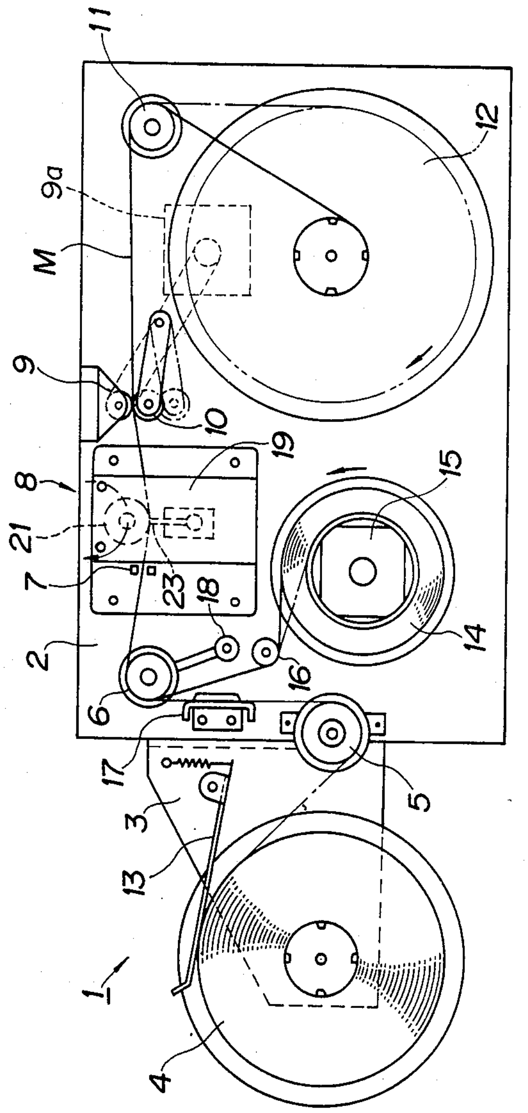
FIG. 2 is an overall view of a laminator in which a cutter device according to the present invention may be used.

FIG. 2 shows an overview of a film laminator 1 in which an embodiment of the cutter according to the invention may be used. A roll of label material 4 is supported on a roll arm 3 mounted on one end of a base plate 2. The label material 4 is threaded over rollers 5 and 6 so as to pass over a film application table 17 therebetween. It then passes along a path through a sensor 7, through a cutter device 8 according to this invention, between a pinch roller 9 and an idle roller 10 biased against the pinch roller 9, and then over a roller 11 to a take-up roll 12 on which it is taken up. As shown, idle roller 10 may be rotated away fom pinch roller 9 during the threading of the label material 4. The label material 4 is printed in advance with a bar code and/or other required information by means of a printer (not shown). A tension bar 13 is maintained in resilient pressure contact with the roll of label material 4 so as to stabilize the feed tension thereof.

Separately, a strip of transparent film 14 is fed off a roll of such film supported on a feed shaft 15 and follows a path over an idle roller 16 and past the film application table 17 to the roller 6. As it passes film application table 17, the transparent film 14 is pressed onto and laminated over the label material 4 by pressure exerted by an adhesion roller 18 which is biased against the film application table 17 but can be rotated away during threading. Then the transparent film 14 and the label material 4, together constituting a laminate M, travel along the path described earlier in connection with the label material 4 alone, and are finally wound onto the take-up roll 12.

Figure 5:
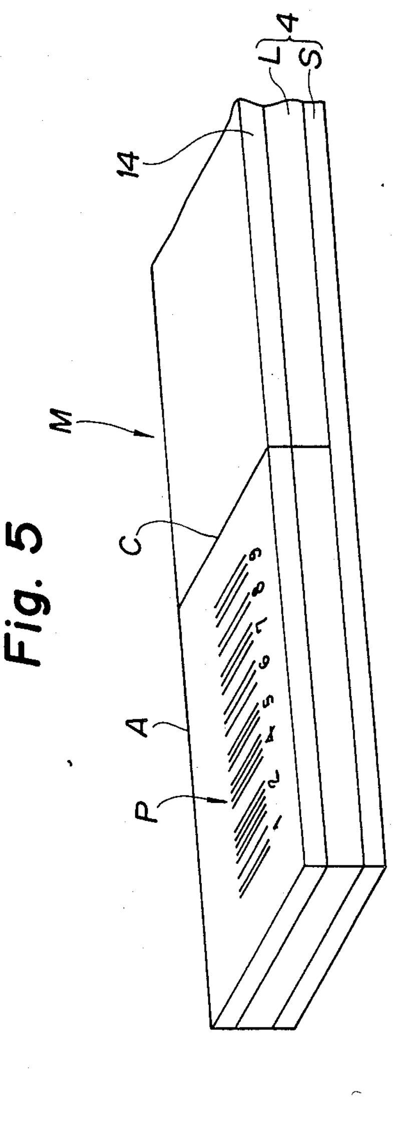
FIG. 5 is a perspective view of a laminated film strip which is suitable for cutting by the cutter device according to the invention.

The structure of the laminate M is illustrated in FIG. 5. As shown, the label material 4 includes a label strip L releasably adhered to a substrate strip S. The laminate M is formed by overlaying the transparent film 14 onto the label material 4 so as to protect the printing P on the surface of the label strip L. Thus, by using the cutter device 8 to cut partially through the laminate M along the cut line C to an appropriate depth, such as the depth of the upper surface of the substrate S, it is possible to obtain a strip of laminated labels A, each having the desired size. Cutter device 8 will cut along a cut line C between each adjacent pair of labels A on the strip of laminate M. For the proper positioning of laminate M so that cut line C is adjacent cutter device 8, laminate M has marks or other indications on it which can be detected by sensor 7, indicating that laminate M is positioned for cutting. For example, optically detectable black marks (not shown) may be preprinted at regular intervals on the back side of substrate strip S.

The take-up roll 12 is provided with a drive motor (not shown) having a built-in slip mechanism, while the pinch roller 9 is driven by a step motor 9*a*. In this manner, the operation of the pinch roller 9 controls the movement of the strip of laminate M along its path. Since idle roller 10 is biased against pinch roller 9, it holds laminate M stationary when pinch roller 9 is stopped, but permits laminate M to advance along its path when pinch roller 9 is stepped by step motor 9*a*.

Figure 1:
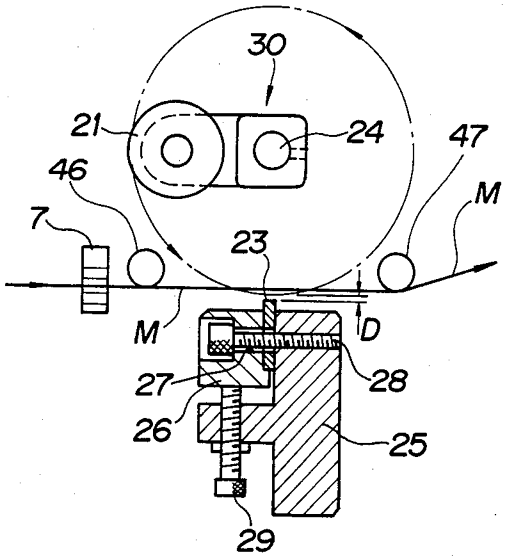
FIG. 1 is a plan view, partially in section, of an embodiment of the cutter device according to the present invention.

The cutter device 8 shown in FIG. 2 is illustrated in a detailed, partially cross-sectional view in FIG. 1, as seen with its upper cover 19 removed. As shown, the cutter device 8 has a stationary cutter 23 and a revolving member such as revolving base roller 21 which revolves with a rotatable roller assembly 30 about a drive shaft 24 at the axis of rotation. The roller 21 and the cutter 23 are positioned opposed to each other on opposite sides of the path of laminate M. Guides 46 and 47 serve as positioning means to position laminate M along the path and roller 21 pushes laminate M against a cutting surface on cutter 23 each time it revolves around drive shaft 24. The stationary cutter 23, which may be a blade, is held clamped between a cutter retainer 26 and a cutter base 25 fixed on the base plate 2. Cutter 23 is arranged so that the clearance interval D between its cutting edge and the locus of the outermost point of the revolving base roller 21 can be adjusted within the range allowed by an adjustment groove 27 defined in cutter retainer 26 by adjustment screws 28 and 29.

Figure 3:
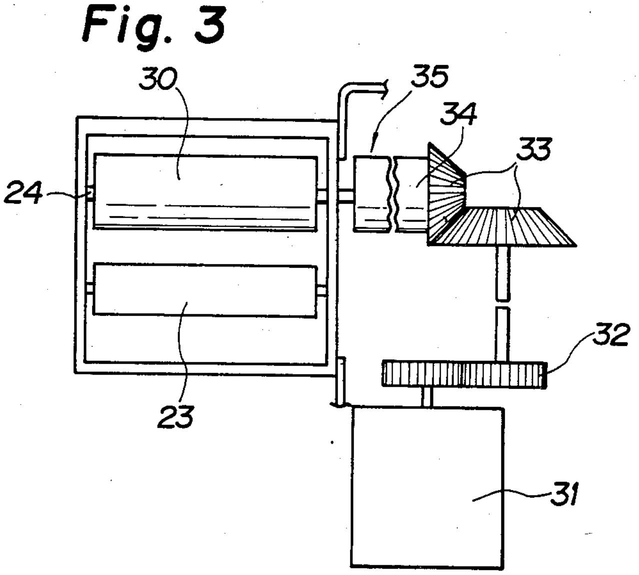
FIG. 3 is a schematic representation of a cutter device according to the invention.

FIG. 3 schematically illustrates the drive mechanism for the roller assembly 30 by which the base roller 21 is supported eccentrically on the drive shaft 24. Rotational motion from an induction motor 31 is transmitted through speed-change gears 32 to spiral gears 33 and then through rotatable members such as a gear 34 and a clutch mechanism 35 to the roller assembly 30. When the clutch mechanism 35 is engaged, roller assembly 30 revolves, bringing roller 21 past cutter 23.

Figure 4:
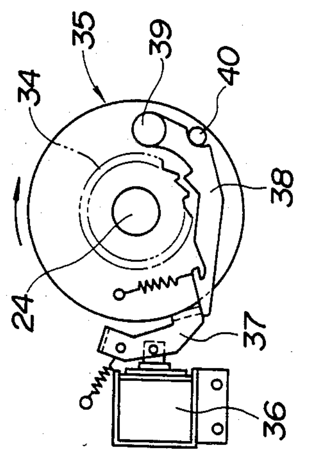
FIG. 4 is a detailed view of the clutch mechanism employed in the cutter device according to the invention.

As shown in FIG. 4, the clutch mechanism 35 is arranged so as to transmit the rotational power from the induction motor 31 to the roller assembly 30 when a solenoid 36 is actuated and moves a trigger 37, pulling it out of engagement with spring-biased latch 38, thus allowing latch 38 to engage with gear 34. FIG. 4 also shows a latch pivot pin 39 and a stopper 40. When solenoid 36 is deenergized, trigger 37 moves back into the clutch disengaging position, in which it catches latch 38 and pivots it around pivot pin 39 against stopper 40, returning it to the disengaged position shown in FIG. 4. Solenoid 36 may thus be switched on and off in a short period of time to permit roller assembly 30 to revolve only once, if desired, as discussed below.

Figure 6:
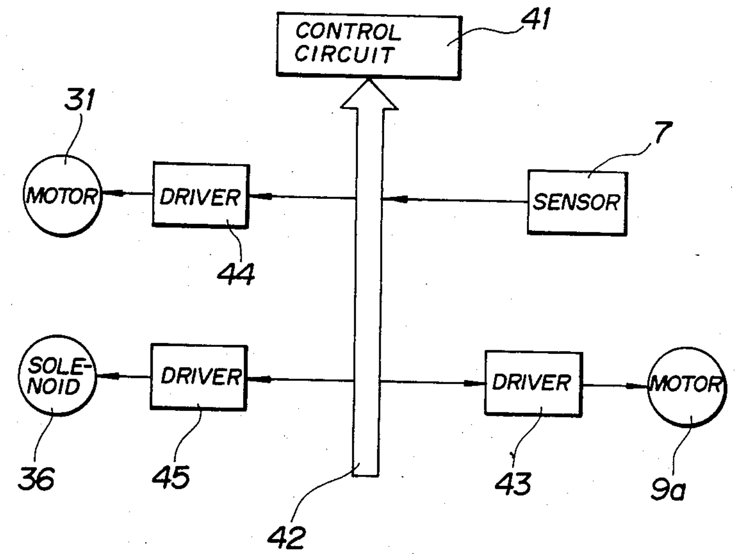
FIG. 6 is a schematic block diagram of control circuitry for controlling the cutter device according to the invention.

FIG. 6 shows control circuitry which may be used to control cutter device 8 in the laminator 1 of FIG. 2. The control circuitry centers around control circuit 41, which may be a microprocessor or other appropriate logic circuitry. Control circuit 41 is connected to the other components of the control circuitry through control bus 42. Sensor 7 provides signals through control bus 42 to control circuit 41, and control circuit 41, in turn, controls step motor *9a* through drive circuit 43, induction motor 31 through drive circuit 44, and solenoid 36 through drive circuit 45. During the operation of laminator 1, control circuit 41 provides signals to drive circuit 43 causing step motor *9a* to advance the laminate M, including the label material 4 overlaid with the film 14, step-by-step along the path through laminator 1. When sensor 7 detects a mark on the laminate M indicating that laminate M is positioned for cutting, it immediately provides a signal to control circuit 41, which immediately signals drive circuit 43 to stop the stepping by motor *9a*. The laminate M will thus be stopped each time a mark is detected by sensor 7, so that the marks should be spaced at intervals corresponding to the length of the labels on label strip L.

While laminate M is stopped, control circuit 41 causes cutter device 8 to cut film 14 and, if stationary cutter 23 is adjusted appropriately, to also cut label strip L. In order to perform the cutting, control circuit 41 first sends a signal to drive circuit 44 to cause the operation of induction motor 31. Then, control circuit 41 sends a signal to drive circuit 45 causing solenoid 36 to be actuated for a short period of time. Actuation of solenoid 36 causes the trigger 37 to disengage from latch 38, so that latch 38 engages gear 34. Clutch mechanism 35 thus comes into engagement with gear 34 so that the revolving base roller 21 is made to revolve through one revolution. As a result, film 14 of the laminate M is cut along the desired cut line C.

As noted above, solenoid 36 is actuated for a short time, and as soon as sufficient time has passed for trigger 37 to disengage from latch 38, solenoid 36 is deenergized, so that trigger 37 may return to its original position for engaging latch 38 upon completion of one revolution. Therefore, revolving base roller 21, together with the roller assembly 30 on which it is supported, is stopped after a single revolution. When sufficient time has passed for the revolution to be completed, control circuit 41 provides a signal to drive circuit 43 causing step motor *9a* to again begin advancing laminate M along its path. A signal may also be provided to drive circuit 44 causing induction motor 31 to stop.

As mentioned above, the interval D between the revolving roller 21 and the stationary cutter 23 can be adjusted. This is done by loosening the screw 28 so as to release the pressure of the cutter retainer 26 on the stationary cutter 23 and then turning the screw 29 to increase or decrease the size of the interval D. It is therefore possible to adjust the cutter device 8 so that it will cut only the film 14 or so that it will cut both the film 14 and the label strip L. Because the cutter 23 is stationary during operation, the cutter device 8 can be adjusted with particularly high accuracy.

In the above-described embodiment, the label material 4 is supplied to the laminator 1 in roll form and already printed, but it is also possible to connect a printer with the laminator and supply the laminator with printed label material directly from the printer.

As will be clear from the above description, the cutter device for a laminated film strip in accordance with this invention cuts the laminated film strip by the revolution of a revolving base roller positioned opposite a stationary cutter. Therefore, the cutter device can be easily adjusted to cut the laminated film strip at the desired positions and to the desired depth, thereby obtaining laminated labels separated by partial cuts and having their printed portions covered by a protecting film.

Although the present invention has been described in connection with the preferred embodiments thereof, many other variations and modifications will now become apparent to those skilled in the art. It is preferred, therefore, that the present invention be limited not by the specific disclosure herein, but only by the appended claims.

What is claimed is:

1. A cutter device for partially cutting a laminated strip comprising:

means for positioning the laminated strip along a path;

a stationary cutter assembly positioned at one side of the path and having a cutting surface disposed toward the laminated strip positioned along the path; and a rotatable assembly positioned generally opposite the stationary cutter and on another side of the path opposite the one side, the rotatable assembly comprising a revolving roller for pushing the laminated strip against the cutting surface when the rotatable assembly rotates for partially cutting the laminated strip, said rotatable assembly comprising a rotatable drive shaft, the revolving roller being supported eccentrically relative to the drive shaft for pushing the laminating strip each time the drive shaft rotates.

2. The cutter device of claim 1 in which the path of the laminated strip has an inlet end for entry of the laminated strip and an outlet end for exit of the laminated strip, the device further comprising moving means for moving the laminated strip along the path from the inlet end to the outlet end.

3. The cutter device of claim 2, further comprising control means for controlling the rotation of the rotatable assembly, the control means comprising a sensor for sensing that the laminated strip has been moved by the moving means into position for cutting and switchable means for actuating the rotatable assembly to partially cut the laminated strip.

4. The cutter device of claim 1, further comprising drive means for rotating the drive shaft, the drive means comprising motor means for providing rotational motion and clutch means for selectively transmitting the rotational motion to the drive shaft.

5. The cutter device of claim 4 in which the clutch means comprises first and second rotatable members and latch means for selectively engaging the first and second rotatable members, the first rotatable member being for receiving rotational motion from the motor means, the engagement of the latch means causing the received rotational motion to be transmitted to the second rotatable member.

6. The cutter device of claim 1 in which the stationary cutter assembly comprises a cutter with the cutting surface defined thereon and positioning means for adjustably positioning the cutter for adjusting the distance between the cutting surface and the revolving member.

7. A laminator for providing a laminated strip, comprising:

the cutter device of claim 2, laminating means at the inlet end of the path through the cutter device for providing the laminated strip to the cutter device; and take-up means at the outlet end of the path through the cutter device for taking up the partially cut laminated strip.

8. The laminator of claim 7 in which the laminating means comprises a label material supply for providing a strip of label material, a film supply for providing a strip of transparent film, and application means for applying the transparent film to the label material to provide the laminated strip.

9. The laminator of claim 8 in which the label material has a printed side, the application means further being for applying the transparent film to the printed side.

10. The laminator of claim 8 in which the laminating means is further for providing the laminated strip with the transparent film at the one side of the path at which the stationary cutter assembly is positioned, whereby the transparent film is cut by the cutting device.

* * * * *